(12) United States Patent
Sakezles

(10) Patent No.: US 7,272,766 B2
(45) Date of Patent: Sep. 18, 2007

(54) METHOD OF MAKING TISSUE SIMULATING ANALOG MATERIALS AND MODELS MADE FROM SAME

(76) Inventor: Christopher Sakezles, 500 Trinity La., Apt. 7202, St. Petersburg, FL (US) 33716

( * ) Notice: Subject to any disclaimer, the term of this patent is extended or adjusted under 35 U.S.C. 154(b) by 146 days.

(21) Appl. No.: 11/098,248

(22) Filed: Apr. 4, 2005

(65) Prior Publication Data

US 2006/0253761 A1    Nov. 9, 2006

(51) Int. Cl.
*G06F 11/00*    (2006.01)
(52) U.S. Cl. ..................... 714/742; 434/262
(58) Field of Classification Search ............... 424/1.73; 426/104; 378/18; 434/267, 262; 703/2; 606/34, 42; 714/742
See application file for complete search history.

(56) References Cited

U.S. PATENT DOCUMENTS

| 4,351,822 | A | * | 9/1982 | Allen ........................ 424/1.73 |
| 4,455,318 | A | * | 6/1984 | Maurice et al. ............. 426/104 |
| 4,646,334 | A | * | 2/1987 | Zerhouni ..................... 378/18 |
| 4,867,686 | A | * | 9/1989 | Goldstein .................... 434/267 |
| 5,680,590 | A | * | 10/1997 | Parti ............................. 703/2 |
| 6,030,379 | A | * | 2/2000 | Panescu et al. ............... 606/34 |
| 6,056,745 | A | * | 5/2000 | Panescu et al. ............... 606/42 |
| 6,780,016 | B1 |  | 8/2004 | Toly |
| 2004/0118224 | A1 |  | 6/2004 | Tate et al. |
| 2004/0234933 | A1 |  | 11/2004 | Dawson et al. |

OTHER PUBLICATIONS

How to Meet the New Simulation Testing Requirements, Medical Device & Diagnostic Industry Magazine, MDDI Article Index, Mar. 1998.
The Effects of Testing Environment on the Viscoelastic Properties of Soft Tissues, Mark P. Ottensmeyer et al., ISMS 2004.
"Measuring In Vivo Animal Soft Tissue Properties for Haptic Modeling in Surgical Simulation," Iman Brouwer et al., Medicine Meets Virtual Reality 2001, J. D. Westwood et al.

* cited by examiner

*Primary Examiner*—David Ton
(74) *Attorney, Agent, or Firm*—Timothy H. Van Dyke; Beusse Wolter Sanks Mora & Maire

(57) ABSTRACT

Disclosed herein are synthetic anatomical models, and methods of making and using same, that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical characteristics, and component-to-component interfacial properties with the appropriate target tissue and anatomy.

31 Claims, No Drawings

METHOD OF MAKING TISSUE SIMULATING ANALOG MATERIALS AND MODELS MADE FROM SAME

BACKGROUND OF THE INVENTION

During the development of any new medical device, various tests may be required, including the characterization of physical properties (geometric, mechanical, electrical, electromagnetic, thermal, chemical, etc), the evaluation of overall device performance (numerical simulation or simulated use testing), or testing to determine the effect of the device on living tissues. These development tests may be broadly classified as either biological tests, theoretical tests, or physical tests, although there are areas where these testing classes overlap one another.

Biological testing generally involves an analysis of the interaction between the device and human or animal tissues. The biological tests that are performed first are generally biocompatibility tests, which evaluate the tendency of the device to cause damage to living tissues by mere presence of the materials comprising the device. Later on in the development cycle, the device may be tested in a live animal (animal study) or a human patient (clinical trial) to determine the ability of the device to perform its intended use and to evaluate safety and efficacy (device performance). Animal studies represent a special type of test known as simulated use testing, so called because the animal is a simulation of the actual use (human) environment.

Theoretical or computational tests may include finite element analysis, kinematic analysis, and computational fluid dynamics. These tests employ knowledge of the physical characteristics (strength, mass, density, viscosity, etc) of the device and actual use environment to construct a computer model of the device—tissue system. This type of model may then be used to predict device performance, the tendency of the device to fail, and possibly the tendency of the device to cause injury. Of course, these models are limited by the assumptions made in their derivation and the computational power of the computer. Unfortunately, it may be difficult to quantitatively describe a device, and more importantly the actual use environment, in sufficient detail to yield realistic results.

Physical testing essentially evaluates the design of the device. That is, this physical testing may involve; (1) the measurement of device geometry such as lengths, diameters, and wall thicknesses, (2) the measurement of mechanical properties such as tensile strength and stiffness, (3) the measurement of other device characteristics such as color, thermal conductivity, dielectric properties or other properties, or (4) simulation testing involving trial use of the device in some model of the actual use environment. The purpose of this simulation testing is to evaluate the safety (tendency to injure) and efficacy (performance characteristics) of the device, and in general to evaluate the ability of the device to perform it's intended use. As previously stated, animal studies are one important form of simulation test. Other vehicles (the simulated environment) for this type of testing include cadavers (both human and animal) and benchtop fixtures, which are man-made representations of a particular target anatomy.

The new FDA quality system regulation (QSR) now requires testing under simulated or actual use conditions for all nonexempt Class II and Class III medical devices. Not all manufacturers perform actual use (human clinical trial) testing for every medical device, so in these cases simulation testing is definitely a requirement. At least four traditional simulation options are available to meet this requirement, each with its own advantages and drawbacks. These four general approaches (Table I) to simulation testing involve theoretical (computer) models, benchtop (physical) models, cadaver (human or animal) models, and live animal models. Once again, human subjects are also employed in the development of many medical devices, but since humans represent the actual use environment, these tests (clinical studies) are not considered simulation tests.

TABLE I

The four general approaches to simulation testing including the environment and models involved.

| Theoretical Model | Benchtop Model | Cadaver Model | Live Animal |
|---|---|---|---|
| In vitro Theoretical or computational model | In vitro Physical properties model | In vitro Human or animal cadaver | In vivo Animal study |

Typical medical device development schemes generally involve testing early prototypes in simple bench top test fixtures. Feedback from these tests shape the product through design revisions that are subsequently evaluated using the same model. However, since this process is iterative, as the design matures the models that are needed generally become more complex. For example, a new coronary catheter may undergo initial testing in simple plastic tubes, followed by glass models designed to mimic the size and geometry of the coronary vasculature. The product may experience a series of changes resulting from these tests until the designer is satisfied with performance, and once a certain level of confidence is achieved the testing will proceed to the next available model. In the medical device industry this model is generally a live animal.

In practice, the medical device industry typically employs one or more of the four previously mentioned (Table I) model types in simulation testing prior to seeking approval for human use (a clinical trial). Of course, common sense dictates that the model selected be representative of actual use conditions, but only the clinical trial, which is not a simulation test, fully satisfies this criteria. Unfortunately, human subjects are unavailable for use until late in the development cycle due to risk, regulatory, and ethical considerations. A live animal model has therefore traditionally been the next best choice.

Animal models are currently the gold standard of preclinical trial medical device simulated use testing. In fact, the quality of data produced in these studies can be very high, particularly if the proper animal model is selected, the device and protocol are well designed, and the correct number of animals is used. Designed experiments are possible and are commonly employed, but require an increase in the number of animals. These tests are also performed under physiological (for the animal) conditions. Unfortunately, these studies are expensive because of the staff and facilities required to support the work. A registered facility must be contracted to run the study and care for any animals purchased, a surgeon must be retained to perform the required procedures and to generate the study protocol, and the services of a veterinarian, anesthesiologist, and surgical aide are also required. These studies can easily exceed $100,000 in total costs, and grow even more costly as the number of animals is increased.

The inability to test prototype devices on human subjects is the reason medical device developers resort to animal studies in the first place. Still, animal models suffer from a whole range of unique problems, including the many deviations between human and animal anatomy and physiology, the confounding effects of variation between individual animals, and the unpredictability that arises from using a model that is extraordinarily complex.

Animal models may include live canine, porcine, or bovine specimens, among others. While these animals do offer an in vivo environment, their anatomy and physiology differs significantly from that of a human. The great expense and specialized facilities required limit their in-house use. Reproducibility may also be an issue as both inter- and intrasubject variability are difficult to control. Additional considerations include contention with the Animal Welfare Act, the significant expense associated with contracting regulated facilities and medical practitioners, and the risks related to handling biohazardous materials.

To get around these issues, developers tend to gravitate toward simpler and more accessible models such as cadavers and benchtop fixtures. Unfortunately, there tends to be an inverse relationship between the usefulness and complexity of the model employed. For example, cadaver tissues provide an accurate representation of anatomical geometry, but the required chemical preservation greatly alters the physical characteristics of the tissues. In addition, biological temperatures and flows cannot generally be simulated, subjects are difficult to source and maintain in useful quantities, and an educational institution must almost always be contracted (at considerable expense) to perform the study.

These factors drive early stage medical device developers to simple benchtop fixtures made (usually) in house by the developer. Unfortunately, these models are typically designed by individuals lacking an understanding of anatomy and physiology, and are usually fabricated from typical engineering materials such as metal, glass, and plastic. While an argument may be made that these models are better than nothing, they are certainly not representative of actual use conditions.

SUMMARY

The inventor has realized the shortcomings of the prior art and has discovered that there is a need for a more improved modeling system for testing medical devices. The inventor has realized that the quality of test data is dependent on the good logic behind the test protocol and the quality of the model employed. In fact, a poor or inadequate model is more likely to yield misleading data, and a design based at an early stage upon this data is more likely to require correction at a later stage in development. The use of a poorly conceived model in development testing will lead to reduced product quality, increased development costs, and greatly lengthened product timelines. Fortunately, these failures may be avoided by employing an intelligent development scheme in conjunction with a high quality model. Accordingly, the subject invention pertains to a method of producing complex synthetic anatomical models that are designed to enable simulated use testing by medical device companies, medical device designers, individual inventors, or any other entity interested in the performance of medical devices. The subject techniques produce models that are unique in possessing a level of complexity that allows them to be substituted for either a live animal, an animal cadaver, or a human cadaver in the testing of these devices. These models are further characterized by a similarity of geometry, individual component physical characteristics, and component-to-component interfacial properties with the appropriate target tissue and anatomy.

The model embodiments produced by the methods of the subject invention may serve as a highly sophisticated bench top model that is designed to be used by medical device developers both early and late in the development process. These models mimic not only the geometry of the target anatomy, but also the physical characteristics of the living tissues that contact the device.

One important feature of certain embodiments of the subject invention is the production of synthetic analog materials that can closely emulate the physical characteristics of living tissues. Production of such materials is enabled by a precise validation system that ensures that the analog materials sufficiently simulate living tissues. In one embodiment, the subject invention pertains to a process for manufacturing tissue analog materials useful for testing medical devices that comprises evaluating at least one physical characteristic of a living non-human animal tissue under predetermined test conditions in situ or ex situ to thereby generate a first physical characteristic data value; fabricating a tissue analog material intended to simulate said living non-human animal tissue; evaluating at least one physical characteristic of said tissue analog material corresponding to said at least one physical characteristic of said living non-human animal tissue to generate a second physical characteristic data value; and comparing said second physical characteristic data value to said first physical characteristic data value to determine whether said tissue analog material sufficiently simulates said living non-human animal tissue to render said tissue analog material suitable for medical testing.

Model embodiments of the subject invention may be nearly as simple to use as a bench top fixture, but provide feedback that is superior in many respects to cadaver tests, animal studies, and even human clinical trials. In fact, a prototype device may be tested not just in terms of device performance, but also in terms of effect on the target anatomy. This is possible because the device interfacing portion of the model is removable, allowing a quasi-histological examination of the target anatomy after each use. In addition, because the models are artificial and mass produced, multiple tests may be performed either under identical conditions or by altering only the test parameters (temperature, flow, contact angle, etc) desired. This capability helps to eliminate the statistically confounding effect of model variation that plagues cadaver, animal, and human subject studies, and also enables the use of designed experiments to explore device-tissue interactions and interactions between various design parameters.

The subject invention produces models possessing several advantages over typical bench top fixtures. Some fixtures in use today may be designed to mimic the overall size and geometry of a particular target tissue, and the best of these are also designed to work at body temperature in the presence of fluids. However, the use of engineering materials in the construction of these models make them dissimilar to the target anatomy in a profound way. This calls into question the value of any data collected, even when designed experiments are employed. In addition, these models may only be used to predict device performance, not the effect of the device on the target tissue.

In contrast, the methods of the subject invention produce models that enable a potentially large number of tests to be completed in an environment that is both geometrically and mechanically similar to the target anatomy. These tests may be performed by an engineering technician on a lab bench, but the tests still produce very high quality data. Also, because this data may be generated early in the development cycle, design errors are discovered sooner, leading to a shorter cycle and a reduced development budget. Further, unlike traditional bench top testing, models produced by the subject methods allows the user to predict how a device will actually function in the human body, and since the effect of the device on the target tissue can be predicted by way of the quasi-histological examination, the risk to the patient may be predicted early in the design process before animal studies and human clinical trials are typically performed.

Use of models implementing analog materials produced by the methods herein also have several advantages over cadaver studies. Cadaver models provide a fairly accurate representation of size and geometry, but the mechanical properties of the target anatomy are altered by death of the subject and by the required tissue preservation techniques. It is impossible to use these models at normal body temperature or in the presence of fluids, and they cannot be employed to accurately predict the physical effect of the device on the target tissue. An educational institution must almost always be contracted (along with a principal investigator) to perform the study, and since the specimens are difficult to source it is common to run only a single test. Biohazards are an additional risk.

In contrast, use of models implementing analog materials produced by the subject methods enables the generation of animal study quality data (in a much greater quantity) using a simple bench top setup that may be used by an engineering technician. The need to contract with research facilities, employ costly medical practitioners, and also any exposure to biohazards is eliminated. In addition, these models may be used at body temperature in the presence of any real or simulated physiologic fluid, and since the device contacting portions of the model may be removed and replaced, an unlimited number of tests may be performed.

Models implementing analog materials produced by the methods of the subject invention have several advantages over live animal models. As previously stated, the quality of data produced in these studies can be very high, particularly if the proper animal model is selected, the device and protocol are well designed, and the correct number (more is always better) of animals is employed. However, a registered facility must be contracted to run the study and care for any animals purchased. A surgeon must be retained to perform the required procedures, generate the study protocol, and to ensure approval from the animal care and use committee of the facility. The services of a veterinarian, anesthesiologist, and surgical aide are also required. Needless to say, these studies are very expensive and grow ever more costly as the number of animals is increased. The cost of discovering a design flaw at this stage is very high, possibly causing modification, termination, or repetition of the study. Biohazards are also a significant risk.

In effect, the inclusion of models according to the subject invention in the development process allows the collection of animal study quality performance data (Table II) at a risk level that is normally associated with bench top studies. In fact, by employing this technology early on in the development process, vital feedback on device performance may be collected before erroneous assumptions can adversely affect the design. This capability not only reduces the probability of costly late stage design changes, but also shortens the project timeline and reduces the overall cost of development. In addition, these models may be used in an ordinary laboratory by engineering personnel. The need to own or contract with research facilities, pay for costly medical practitioners, and absorb risks associated with biohazard exposure are all eliminated. An innocent life (the animal) is also spared.

TABLE II

A comparison of the various model types available in industry.

| | Positive Attributes | | | | Negative Attributes | | | Quality Attributes | |
|---|---|---|---|---|---|---|---|---|---|
| Model | Lab Testing Possible | Predict Tissue Damage | Target Anatomy Modeled | Tissue Properties Modeled | Medical Contractors Required | Biohazard Exposure Risks | Live Animal Loss | Data Quality | Relative Expense |
| ARM | X | X | X | X | | | | High | Med |
| Fixture | X | | X | | | | | Low | Low |
| Cadaver | | | | | X | X | | Med | Med |
| Animal | | X | | X | X | X | X | High | High |
| Human | | X | X | X | X | X | | High | Extreme |

These and other advantageous aspects of embodiments of the subject invention are described in the detailed description below, description of the drawings, and the appended claims.

DEFINITIONS

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

The term "tissue analog material(s)" as used herein refers to a material or combination of materials designed to simulate one or more physical characteristics (properties) of a relevant living target tissue. Analog materials used to design tissue analog materials may include, but are not limited to, hydrogel, interpenetrating polymer networks, fibers, silicone rubber, natural rubber, other thermosetting elastomers, other thermoplastic elastomers, acrylic polymers, other plastics, ceramics, cements, wood, styrofoam, metals, actual human tissues, actual animal tissues, and any combination thereof.

For model embodiments comprising one or more components, each component part may be constructed from one or more tissue analog materials.

The tissue analog materials are formulated to simulate one or more physical characteristics of a target living tissue. These physical characteristics include, but are not limited to, uni-axial or multi-axial tensile strength or modulus, uni-axial or multi-axial compressive strength or modulus, shear strength or modulus, coefficient of static or dynamic friction; surface tension; elasticity; wettability; water content; electrical resistance and conductivity; dielectric properties; optical absorption or transmission, thermal conductivity, porosity, moisture vapor transmission rate, chemical absorption or adsorption; or combinations thereof. Each tissue analog material is designed so that one or more physical characteristics of the tissue analog material will sufficiently match the corresponding physical characteristic(s) of the relevant tissue on which the tissue analog material is based. More specifically, each tissue analog material is preferably formulated so that the physical characteristic(s) of the tissue analog fall within a range that is no more than 50% lesser or greater than the targeted physical characteristic(s) of the relevant living tissue on which the tissue analog material is based.

The aforementioned listed physical characteristics are well understood, and may be determined by well-established techniques. References teaching the determination of different physical characteristics (in no way intended to be an exhaustive list) include the following:

(1) Shigley, J. E., and Mischke, C. R. *Mechanical Engineering Design*, 5$^{th}$ Ed., McGraw-Hill, 1989.

(2) Harper, C. A., *Handbook of Materials for Product Design*, 3$^{rd}$ Ed., McGraw-Hill, 2001.

(3) Askeland, D. R., *The Science and Engineering of Materials*, 2$^{nd}$ Ed., PWS-Kent, 1989.

(4) LaPorte, R. J., *Hydrophilic Polymer Coatings for Medical Devices*, Technomic Publishing, 1997

(5) Hayt, W. H., and Kemmerly, J. E., *Engineering Circuit Analysis*, 4$^{th}$ Ed., McGraw-Hill, 1986.

(6) Park, J. B., and Lakes, R. S., *Biomaterials, An Introduction*, 2$^{nd}$ Ed., Plenum Press, 1992.

(7) Lindenburg, M. R., Editor, *Engineer in Training Manual*, 8$^{th}$ Ed., Professional Publications, 1992.

Other references of note that are incorporated herein are Ottensmeyer et al., "The Effects of Testing Environment on the Viscoelastic Properties of Soft Tissues, Proceedings of Medical Simulation," *International Symposium*-ISMS 2004, Cambridge, Mass., Jun. 17–18, 2004 and references cited therein; and Brouwer et al. "Measuring in Vivo Anaimal Soft Tissue Properties for Haptic Modeling in Surgical Simulation", *Proc. Medicine Meets Virtual Reality*, Newport Beach, Calif., IOS Press, 2001, and references cited therein.

Particular teachings of certain physical characteristics are noted (references numbers related to preceding list):

Tensile strength and modulus, both measured in Pascal (Pa)—Ref 1, pg 186.

Compressive strength and modulus, both measured in Pascal (Pa)—Ref 2, pg 718.

Shear strength and modulus, both measured in Pascal (Pa)—ASTM Standard D3165-00, Standard Test Method for Strength Properties of Adhesives in Shear by Tension Loading of Single-Lap-Joint Laminated Assemblies.

Coefficient of static and dynamic friction, a dimensionless number—Ref 7, pg 445.

Surface tension, measured in dynes/cm—Ref 6, pg 57.

Wettability, measured in terms of contact angle (degrees)—Ref 4, pg 3.

Water content, measured in mass percent (%)—Ref 4, pg 41.

Electrical resistance and conductance, measure in ohm for resistance and mho for conductance—Ref 5, pg 25.

Dielectric properties, measured in various units—ASTM Standard E2039-04 Standard Test Method for Determining and Reporting Dynamic Dielectric Properties.

Optical absorption and transmission, measured in cm$^{-1}$—Ref 3, pg 739.

Thermal conductivity, measured in cal/(cm-s-C)—ASTM Standard D5930-01 Standard Test Method for Thermal Conductivity of Plastics by Means of a Transient Line-Source Technique.

Porosity, measured in volume percent (%)—Ref 3, pg 490.

Moisture vapor transmission rate, measured in g/(mil-in$^2$)—Ref 2, pg 941.

The term "hydrogel(s)" as used herein refers to a unique class of materials that contain a large amount of water and generally exhibit a high degree of elasticity and lubricity. Hydrogels are materials that are wettable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. These materials are ideal for simulating the physical characteristic(s) of many living soft tissues.

The "data value" as used herein refers to a numerical value that is representative of a measurement of one or more physical characteristics. The numerical value is typically provided in a unit of measurement obtained from observation of a specimen under a defined set of conditions.

The term "geometrically mimic" as used herein refers to a comparative relationship of a configuration of an artificial anatomical model, and/or artificial structural component thereof, with a target anatomical structure wherein such configuration comprises one or more similar geometric features of the target anatomical structure to be mimicked, such as length, width, diameter, thickness, cross-section, and/or, in most cases general shape of a particular target anatomical structure.

The term "human or non-human animal tissue" as used herein refers to the one or more tissues that constitute a human or non-human animal anatomical structure.

As used herein the term "human or non-human animal anatomical structure" refers to one or more tissue structural components that make up a part of anatomy of a human or non-human animal. A part of anatomy may include, but is not limited to, whole organs, parts of an organ, or a section of a body comprising one or more tissue types, organ types, and/or part of organ(s).

In certain model embodiments, one or more components may be cooperative with other one or more components. The term cooperative in this context means that such cooperative components are contiguous, engaged, or integrated with one another. Further, components cooperative with one another may be designed to be dissociable, i.e., removably cooperative.

DETAILED DESCRIPTION

The subject invention pertains to synthetic tissue analog materials closely simulating living tissues and their implementation in anatomical models. The subject invention also pertains to complex synthetic anatomical models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical characteristics, and component-to-component interfacial properties with the appropriate target tissue and anatomy.

In one embodiment, the subject invention pertains to a process for producing tissue analog materials useful for testing medical devices. The method embodiment comprises evaluating at least one physical characteristic of a living human or non-human animal tissue under predetermined test conditions to thereby generate a first physical characteristic data value. A tissue analog material is fabricated that is intended to simulate the living non-human animal tissue. At least on physical characteristic of the tissue analog material corresponding to the at least one physical characteristic of the living non-human animal tissue is evaluated to generate a second physical characteristic data value. The first and second data values are compared to determine whether the tissue analog material sufficiently simulates the living non-human animal tissue.

Living human or non-human tissue may be evaluated in vivo, in situ, ex vivo, or ex situ. In vivo testing refers to testing of tissue in a living body. In situ testing refers to testing of a tissue in its natural position. In situ may include in vivo testing or may relate to testing of a structural component of tissue (live or dead) contained in its natural position within a larger section of anatomy that has been removed from a living or non-living body. Ex vivo testing refers to testing of living tissue outside of a living body. Ex situ refers to testing of a tissue occurring outside a natural position of said tissue. Accordingly, the invention contemplates the evaluation of living or non-living tissue. In most cases, it is preferred that evaluation of living tissue is conducted to obtain a first data value of one or more physical characteristics. It is thought that such evaluation will obtain a data value of one or more physical characteristics that most closely resembles the physical characteristics of the tissue in its natural, living environment and will thus serve to create the highest integrity of simulation that is enabled by tissue analog materials for the testing medical devices.

Under current ethical guidelines and considerations, the obtention of data values from living human tissue, though in most instances preferred, may be difficult. Because of not being as constrained by such ethical considerations, evaluation of living tissue in living non-human animals in most cases is less difficult to conduct. In a specific embodiment, the subject invention pertains to a method of producing a tissue analog material that involves the evaluation of at least one physical characteristic of a living tissue of a living non-human animal to obtain a first data value. A plurality of analog material candidates are fabricated intended to simulate said living tissue with respect to said at least one physical characteristic. The analog material candidates are evaluated under test conditions to obtain second data values for corresponding physical characteric(s) for each analog candidate, respectively. The second data values are compared to the first data value to identify tissue analog materials that sufficient simulate the living tissue. The resulting analog materials may then be assembled into a configuration that geometrically mimics either the human animal or non-human animal anatomy.

Tissue may be evaluated to obtain data value(s) for one or more characteristics by conducting tests or by referring to known and/or published data values previously performed. As more and more tests are performed, a collection of values will be produced which may be referred to in evaluating newly fabricated analog material candidates. This collection of values and related information may be assembled in an accessible database.

In a specific embodiment, the tissue analog material is determined to sufficiently simulate the non-human animal tissue when the second data value is no more than 50 percent greater than or less than the first data value. In another embodiment, the tissue analog material is determined to sufficiently simulate the non-human animal tissue when the second data value is no more than 40 percent greater than or less than the first data value. In another embodiment, the tissue analog material is determined to sufficiently simulate the non-human animal tissue when the second data value is no more than 30 percent greater than or less than the first data value. In yet another embodiment, the tissue analog material is determined to sufficiently simulate the non-human animal tissue when the second data value is no more than 20 percent greater than or less than the first data value.

The model embodiments of the subject invention create a test environment similar in many ways (mechanical properties, physical properties, temperature, flow rate, viscosity, etc) to that of a living animal. In addition, individual tests may be repeated as many times as desired under identical or (if desired) altered conditions. Also, the tissue-contacting portion of the model may be removed to allow a quasi-histological examination to be performed after each test, an important feature that allows the engineer to predict the tendency of a particular device to inflict injury (or other effect) on the patient.

The geometric data needed for fabrication is typically obtained in two ways. The traditional approach is to obtain data from the literature on morphology or from cadaver measurements. While not a bad approximation, this method is time-consuming and permits a large degree of error. A better method would be to get the geometric data directly from a patient or from sources such as the Visible Human Project.[2]

After collecting the appropriate geometric data, the individual model components may be fabricated from appropriate analog materials. Depending on the complexity of the part and the type of materials used, the individual component might be molded, extruded, or machined. For complex geometries, however, these techniques may become cumbersome and expensive. In these cases rapid prototyping techniques such as stereolithography offer a relatively inexpensive alternative. Techniques are being developed that allow actual patient data (obtained from MRI or spiral-CT images) to be fed directly into the rapid prototyping system, thus replicating the patient's anatomy exactly. This technology allows for the production of extremely realistic simulations.

The models of the subject invention are constructed from multiple components, and these individual components are fabricated in such a way that they mimic the geometry (length, width, diameter, thickness, cross-section, shape, etc)

of a particular portion of the target anatomy that is relevant to the medical device under test.

The individual components of the subject invention are assembled in such a way that the interaction between adjacent components yields the overall interaction expected in the actual target tissue. That is, the interfacial properties (bond strength, component-to-component friction, etc) between the various model components are designed to simulate the interaction between the relevant tissues in the target anatomy.

In designing particular embodiments of the subject invention, the relevant anatomy may be conceptually divided into discrete sections that will form the individual components of the model. For example, a model of the femoral artery might employ at least two (and possibly many more) analog materials: one for the femoral artery component and one for the supporting tissue component. Furthermore, these analog materials are formulated to simulate one or more characteristics of the target tissue. This generally involves implementation of two design parameters (modeled properties and data source) to be determined.

The first design parameter typically entails selecting physical characteristics that are important for the analog material to simulate in the decided application. These characteristics will vary depending on the type of device under test, the target anatomy, and the general objective of the testing. For example, if one objective is to determine the tissue damage caused by a device tracking through the femoral artery it would be advantageous to include abrasion resistance in the characteristics list. In addition, if a further objective is to simulate the tendency of the device to penetrate the artery wall then penetration resistance or shear strength might be included in the list as well. Any number of characteristics may be included in the target characteristics list, but it should be noted that as this list gets longer it becomes progressively more difficult to satisfy all of the design requirements. In fact, in typical embodiments, if a particular component requires an analog material with more than three target characteristics it might be better to separate the components into multiple parts.

The second design parameter typically involves selecting the source of the physical characteristics data. That is, it should be determined if the model will be based on human or animal (or both) tissue characteristics. Once this is determined, the data may either be drawn from the literature or generated directly by performing the appropriate physical tests on actual samples of the target tissues. The most common tissue sources for non-human characteristics tests are the sheep and pig, but other animal sources are possible as well.

In one embodiment, once the geometry, target characteristics, and source animal have been selected, tissue testing may commence. Using the very simple femoral artery model brought up as an illustrative example, the model could consist of at least two structural components (artery and support tissue) made from two different analog materials. If it is assumed for the sake of this discussion that the model will be used to evaluate abrasive tissue damage and ease of device passage through the artery, and further assumed that the analog materials will be designed around porcine tissue characteristics, then a pig must be sourced and sacrificed to produce the required samples for testing. It is important to note that tissues begin to degrade immediately after death so preserved samples ideally should not be used for this purpose. The tests performed on the tissue samples may include abrasion resistance, shear strength, and lubricity, but other tests might be included as well. A structural component may be divided up into smaller components or layers to represent the anatomical and histological hierarchy of the target anatomy. For example, referring back to the example of the femoral artery model, the artery component may be comprised of layers representing the layers of the artery (e.g. tunica intima, tunica media and tunica externa).

The data collected from this testing regime will be used as a target in the design of the analog materials, and the design intent is that these analog materials exhibit physical characteristics that simulate the physical characteristics of the target tissue samples. After the materials are formulated their performance will be verified by repeating the same physical characteristics tests that were performed on the original tissue samples on the newly formulated analog material samples. These tests should be performed under conditions as reasonably similar as possible to the original (tissue sample) tests.

Part of the design process involves prioritizing the various target characteristics for the synthetic analog materials. Less important characteristics should be placed further down the list and given a lower priority during the formulation process. This is typically, though not necessarily, required because the design becomes progressively more difficult to produce as the number of modeled characteristics increases. The number of target characteristics are preferably limited to three or fewer. If more complex model behavior is required than this restriction will allow, then the number of components can be increased instead. For example, the artery might by constructed from three two-property analog materials instead of one three-property analog. Typically, a component comprised of several analogs will exhibit a more complex (and realistic) response than a component constructed from a single (multi-property) analog. In the case of the femoral artery model, the artery component itself is preferably composed of two or three different analog materials. The model may also employ multi-part components for skin, fat, muscle, and bone.

The choice of materials used in a constructing the model will to a large extent determine how realistically the model simulates the in vivo environment. For example, many medical device companies presently use glass tubing to mimic portions of the cardiovascular system; however, glass is obviously more rigid than most biological tissues and tends to be much smoother than the luminal structural surface of diseased, or even healthy, blood vessels. Consequently, a catheter will behave much differently in a glass model than in an actual blood vessel.

The composition of individual analog materials is unimportant as long as the relevant characteristics are accurately modeled. Typical engineering materials, including many metals, ceramics, and plastics commonly employed in industry may be used depending on the required analog characteristics. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particularly advantageous in this application because the formula may be manipulated to give a combination of water content, lubricity, abrasion resistance, and other properties characteristic of living soft tissues. In this respect these materials are particularly suited to modeling fragile tissues such as venous or arterial intima and ciliated epithelia. Hydrogels also provide an ideal substrate for maintaining a surface of live cells if so desired.

The methods of producing tissue analog materials may, for example, employ a wide variety of hydrogel materials, including but not limited to polyvinyl alcohol, polyvinyl pyrrolidone, polyethylene oxide, and polyhydroxyethyl methacrylate. This entire class of materials is in general physically tissue-like by nature of incorporating water, but by carefully controlling such parameters as molecular structure, density, wall thickness, durometer, and many other physical characteristics a good match between the actual tissue and analog material may be achieved.

Poly(vinyl alcohol) is normally produced by the acid-catalyzed hydrolysis of poly(vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 100C to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by crosslinking, drawing the material, by heat treatment, or by casting the polymer in solution with gelling agents. These agents create specific interactions between the hydroxyl groups on adjacent chains, bringing them together to improve hydrogel bonding. Many such agents are known, and this process is easily employed on a laboratory scale. This is the method the author employed for the fabrication of PVA gels used in this study. The process (Table III, see Example 1 below) is very simple and basically only involves dissolving the polymer in a solution of water and the gelling agent, dimethyl sulfoxide (DMSO). This solution will spontaneously gel over several hours at room temperature or when chilled. The properties of the resulting gel depend on the molecular weight and concentration of the polymer in solution, as well as the concentration of the gelling agent. Increasing the concentration of the agent tends to improve strength, but also reduces swelling. At any rate, the amount of gelling agent should be minimized because it must be extracted prior to use.

Validation of embodiments of the subject models is, in most cases, a desired objective. First, it will help determine the degree of realism of the simulation—in other words, how accurately the simulation performs compared to the in vivo environment. If the intent is to simulate blood flow in the carotid artery, for example, one type of validation would reveal how flow rate in the simulation compares to the flow rate in the patient.

Validation also identifies the limitations of the simulation. Especially in theoretical simulations, it is important to understand not only the accuracy of the model but also the circumstances under which it breaks down. A simulation might be highly accurate under normal situations, but if an abnormality is introduced, the simulated results might not be representative of a similar abnormality in vivo. Finally, if data from the simulation will be used in support of an FDA submission, it is even more important that the simulation be validated. The stronger the validation, the stronger the submission.

In general, three validation strategies of the models are available: quantitative, qualitative, and indirect. Quantitative validation involves collecting numerical data from the simulation and comparing it to data collected in vivo under similar conditions. Collecting quantitative data usually involves the use of instrumentation—for example, pressure transducers to record simulated blood pressure. Common diagnostic technologies such as ultrasound or MRI might also be used. Of course, technologies such as ultrasound are designed for use on biological tissue, and since the simulation will probably be made of inert materials, some modifications may be necessary, as those skilled in the art will appreciate in view of the teachings herein.

In qualitative validation, experienced users (usually clinicians) use the device in the simulation following the same protocols they would follow when using the product in a patient. After the simulated procedure, users convey in as much detail as possible how the device performed in comparison to their experience of using a comparable device in a patient. To test a new product, the manufacturer should identify current users of similar products. For obvious reasons, users having the most clinical experience will typically yield the best results. When used properly, the "touchy-feely" data generated in the qualitative validation are as important as the numerical data obtained from the quantitative validation.

Indirect validation involves the comparison of physical performance data from the model to the actual use environment. The basic logic behind this form of validation is that if the individual model components exhibit characteristics similar to the target tissues then the model as a whole will exhibit performance similar to the synthetic organ being constructed. This type of validation will typically be followed by other tests once the model is completely constructed.

A strong validation strategy involves a combination of all of these techniques. Conducting only one type of validation leaves open the possibility that some important piece of information has been missed. When used together, the results help maximize the accuracy and degree of realism of the simulation.

The model embodiments of the subject invention comprise features that make them valuable for medical device design and development testing. First, since the models are designed to respond to physical stimulus in a fashion similar to the target (human or animal) anatomy, device performance in the model may be used to predict device performance in the target anatomy. Second, the device interfacing portion of the model may be removed for quasi-histological examination, allowing the effect of the device on the target anatomy to be measured. This is particularly important because it allows the potential for injury to be predicted. Third, because the device interfacing portion of the model can be removed and replaced, a large number of tests can be performed under either identical or varying conditions as desired. This would allow the generation of descriptive statistics on device performance and the execution of meaningful designed experiments, both of which are impossible with live animals or cadavers. Fourth, if a hydrogel substrate is employed to support a living tissue bed, the effect of the test device on actual living cells can be predicted. Fifth, the models may be equipped with pumps, heaters, and other accessories to more accurately model almost every aspect of actual use conditions. Sixth, the models may be equipped with sensors that allow the measurement of device influences such as applied force and pressure on portions of the target anatomy. Also, these models provide a wide range of cost, safety, and logistical benefits to device developers compared to existing benchtop models, cadavers, and live animals.

According to one embodiment, the subject invention pertains to a model that geometrically mimics a target human or non-human animal anatomical structure designed for testing a medical device. The model includes at least one tissue analog material employed by the model, the tissue analog material designed to simulate at least one predetermined physical characteristic of a target human or non-human animal tissue. The at least one tissue analog material is produced by (a) obtaining a first data value pertaining to at least one physical characteristic of the target human or non-human animal tissue; (b) fabricating a plurality of analog material candidates intended to simulate the at least one physical characteristic of the target human or non-human animal tissue; (c) obtaining second data values pertaining, respectively, to at least one physical characteristic of the tissue analog material candidates corresponding to the at least one physical characteristic of the target human or non-human animal tissue; and (d) identifying an analog material candidate whose second data value is no more than 50 percent lesser or greater than said first data value.

According to another embodiment, the subject invention is directed to a process for producing a tissue analog material useful in a model for testing a medical device. The process includes (a) obtaining a first data value pertaining to at least one physical characteristic of a target human or non-human animal tissue; (b) fabricating a plurality of analog material candidates intended to simulate the at least one physical characteristic of the target human or non-human animal tissue; (c) obtaining second data values pertaining, respectively, to at least one physical characteristic of the tissue analog material candidates that correspond to the at least one physical characteristic of the target human or non-human animal tissue; and (d) identifying an analog material candidate whose second data value is no more than 50 percent lesser or greater than the first data value. In a further embodiment, the subject invention is directed to a method of testing a device designed for use on a target tissue in a human or non-human animal. The method includes obtaining an artificial anatomic model configured to geometrically mimic at least one target human or non-human anatomical structure, the artificial anatomic model comprising at least one tissue analog material designed to simulate at least one physical characteristic of a target human or non-human animal tissue; wherein the tissue analog material is produced by (a) obtaining a first data value pertaining to the at least one physical characteristic of the target human or non-human animal tissue; (b) fabricating a plurality of analog material candidates intended to simulate the at least one physical characteristic of the target human or non-human animal tissue; (c) obtaining second data values pertaining, respectively, to at least one physical characteristic of the tissue analog material candidates that correspond to the at least one physical characteristic of the target human or non-human animal tissue; and (d) identifying an analog material candidate whose second data value is no more than 50 percent lesser or greater than the first data value to thereby obtain the tissue analog material; impacting said at least one tissue analog material with said device; and evaluating an affect of said impacting on said at least one tissue analog material.

Finally, while various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims. The teachings of co-pending U.S. patent application Ser. No. 11/050,161 and the teachings of all patents and other references cited herein are incorporated herein by reference to the extent they are not inconsistent with the teachings herein.

What is claimed is:

1. A process for producing a tissue analog material useful in a model for testing a medical device, said process comprising:
   evaluating at least one physical characteristic of a living non-human animal tissue under predetermined test conditions to thereby generate a first physical characteristic data value;
   fabricating at least one tissue analog material intended to simulate said living non-human animal tissue;
   evaluating at least one physical characteristic of said at least one tissue analog material corresponding to said at least one physical characteristic of said living non-human animal tissue to generate a second physical characteristic data value; and
   comparing said second physical characteristic data value to said first physical characteristic data value to determine whether said tissue analog material sufficiently simulates said living non-human animal tissue to render said tissue analog material suitable for medical testing.

2. The process of claim 1, wherein said tissue analog material sufficiently simulates said living non-human animal tissue when said second data value is no more than 50 percent lesser or greater than said first data value.

3. The process of claim 1, wherein said tissue analog material sufficiently simulates said living non-human animal tissue when said second data value is no more than 30 percent lesser or greater than said first data value.

4. The process of claim 1, wherein said tissue analog material sufficiently simulates said living non-human animal tissue when said second data value is no more than 20 percent lesser or greater than said first data value.

5. The process of claim 1, wherein said tissue analog material sufficiently simulates said living non-human animal tissue when said second data value is no more than 10 percent lesser or greater than said first data value.

6. The process of claim 1, wherein said at least one physical characteristic of said living non-human animal tissue is at least one characterstic selected from the group consisting of material strength in uni axial or multi-axial tension, compression, or shear; material modulus in uni-axial or multi-axial tension, compression, or shear; coefficient of static or dynamic friction; elasticity; lubricity; surface energy; hydrophilicity; water content; electrical resistance; electrical conductivity; dielectric properties; light and heat absorption or adsorption; chemical absorption or adsorption; and porosity.

7. The process of claim 1, wherein said at least one tissue analog material is comprised of at least one analog material selected from the group consisting of hydrogel, interpenetrating polymer networks, fibers, silicone rubber, natural rubber, thermosetting elastomers, thermoplastic elastomers, acrylic polymers, other plastics, ceramics, cements, wood, styrofoam, metals, actual human tissues, actual animal tissues, and any combination thereof.

8. The process of claim 1, wherein said at least one tissue analog material comprises hydrogel.

9. The process of claim 1, wherein said evaluating at least one physical characteristic of a living non-human animal tissue occurs in vivo, ex vivo, in situ or ex situ.

10. A model that geometrically mimics a target human or non-human animal anatomical structure designed for testing a medical device, said model comprising:
at least one tissue analog material employed by said model, said tissue analog material designed to simulate at least one predetermined physical characteristic of a target human or non-human animal tissue;
wherein said at least one tissue analog material is produced by (a) obtaining a first data value pertaining to at least one physical characteristic of said target human or non-human animal tissue; (b) fabricating a plurality of analog material candidates intended to simulate said at least one physical characteristic of said target human or non-human animal tissue; (c) obtaining second data values pertaining, respectively, to at least one physical characteristic of said tissue analog material candidates corresponding to said at least one physical characteristic of said target human or non-human animal tissue; and (d) identifying an analog material candidate whose second data value is no more than 50 percent lesser or greater than said first data value.

11. The model of claim 10, wherein (d) comprises identifying an analog material candidate whose second data value is no more than 40 percent lesser or greater than said first data value.

12. The model of claim 10, wherein (d) comprises identifying an analog material candidate whose second data value is no more than 30 percent lesser or greater than said first data value.

13. The model of claim 10, wherein (d) comprises identifying an analog material candidate whose second data value is no more than 20 percent lesser or greater than said first data value.

14. The model of claim 10, wherein (d) comprises identifying an analog material candidate whose second data value is no more than 10 percent lesser or greater than said first data value.

15. The model of claim 10, wherein said at least one physical characteristic of said target human or non-human animal tissue is at least one characterstic selected from the group consisting of material strength in uni axial or multi-axial tension, compression, or shear; material modulus in uni-axial or multi-axial tension, compression, or shear; coefficient of static or dynamic friction; elasticity; lubricity; surface energy; hydrophilicity; water content; electrical resistance; electrical conductivity; dielectric properties; light and heat absorption or adsorption; chemical absorption or adsorption; and porosity.

16. The model of claim 10, wherein said at least one tissue analog material is comprised of at least one analog material selected from the group consisting of hydrogel, interpenetrating polymer networks, fibers, silicone rubber, natural rubber, thermosetting elastomers, thermoplastic elastomers, acrylic polymers, other plastics, ceramics, cements, wood, styrofoam, metals, actual human tissues, actual animal tissues, and any combination thereof.

17. The model of claim 10, wherein said at least one tissue analog material comprises hydrogel.

18. The model of claim 10, wherein said first data value is obtained in vivo, ex vivo, in situ or ex situ.

19. A process for producing a tissue analog material useful in a model for testing a medical device, said process comprising:
(a) obtaining a first data value pertaining to at least one physical characteristic of a target human or non-human animal tissue;
(b) fabricating a plurality of analog material candidates intended to simulate said at least one physical characteristic of said target human or non-human animal tissue;
(c) obtaining second data values pertaining, respectively, to at least one physical characteristic of said tissue analog material candidates that correspond to said at least one physical characteristic of said target human or non-human animal tissue; and
(d) identifying an analog material candidate whose second data value is no more than 50 percent lesser or greater than said first data value.

20. The process of claim 19, wherein (d) comprises identifying an analog material candidate whose second data value is no more than 40 percent lesser or greater than said first data value.

21. The process of claim 19, wherein (d) comprises identifying an analog material candidate whose second data value is no more than 30 percent lesser or greater than said first data value.

22. The process of claim 19, wherein (d) comprises identifying an analog material candidate whose second data value is no more than 20 percent lesser or greater than said first data value.

23. The process of claim 19, wherein (d) comprises identifying an analog material candidate whose second data value is no more than 10 percent lesser or greater than said first data value.

24. The process of claim 19, wherein said at least one physical characteristic of said target human or non-human animal tissue is at least one characterstic selected from the group consisting of material strength in uni axial or multi-axial tension, compression, or shear; material modulus in uni-axial or multi-axial tension, compression, or shear;

coefficient of static or dynamic friction; elasticity; lubricity; surface energy; hydrophilicity; water content; electrical resistance; electrical conductivity; dielectric properties; light and heat absorption or adsorption; chemical absorption or adsorption; and porosity.

25. The process of claim 19, wherein said at least one tissue analog material is comprised of at least one analog material selected from the group consisting of hydrogel, silicone rubber, natural rubber, thermosetting elastomers, thermoplastic elastomers, acrylic polymers, other plastics, ceramics, cements, wood, styrofoam, metals, actual human tissues, actual animal tissues, and any combination thereof.

26. The process of claim 19, wherein said at least one tissue analog material comprises hydrogel.

27. The process of claim 19, wherein said first data value is obtained in vivo, ex vivo, in situ or ex situ.

28. A method of testing a device designed for impact on a target tissue in a human or non-human animal comprising:
    obtaining an artificial anatomic model configured to geometrically mimic at least one target human or non-human anatomical structure, said artificial anatomic model comprising at least one tissue analog material designed to simulate at least one physical characteristic of a target human or non-human animal tissue; wherein said tissue analog material is produced by (a) obtaining a first data value pertaining to said at least one physical characteristic of said target human or non-human animal tissue; (b) fabricating a plurality of analog material candidates intended to simulate said at least one physical characteristic of said target human or non-human animal tissue; (c) obtaining second data values pertaining, respectively, to at least one physical characteristic of said tissue analog material candidates that correspond to said at least one physical characteristic of said target human or non-human animal tissue; and (d) identifying an analog material candidate whose second data value is no more than 50 percent lesser or greater than said first data value to thereby obtain said tissue analog material;
    impacting said at least one tissue analog material with said device; and
    evaluating an affect of said impacting on said at least one tissue analog material.

29. The method of claim 28, wherein said obtaining step comprises obtaining a plurality of artificial anatomical models; said impacting step comprises impacting said at least one tissue analog material of said plurality of models with a plurality of devices, one device per model, and said evaluating step comprises comparing said affect on said at least one tissue analog material of said plurality of models by said impacting with said plurality of devices.

30. The method of claim 28, wherein said at least one physical characteristic of said target human or non-human animal tissue is selected from the group consisting of material strength in uni axial or multi-axial tension, compression, or shear; material modulus in uni-axial or multi-axial tension, compression, or shear; coefficient of static or dynamic friction; elasticity; lubricity; surface energy; hydrophilicity; water content; electrical resistance; electrical conductivity; dielectric properties; light and heat absorption or adsorption; chemical absorption or adsorption; or porosity.

31. The method of claim 28 wherein said evaluating comprises determining abrasion, stress, strain, or perforation to said at least one tissue analog material by said impacting step.

* * * * *